United States Patent
Albert et al.

(10) Patent No.: US 11,742,713 B2
(45) Date of Patent: Aug. 29, 2023

(54) METHOD FOR FIXING A FIRST COMPONENT IN A SECOND COMPONENT, AND UNIT, IN PARTICULAR AN ACTUATOR, FORMED BY THE METHOD

(71) Applicant: Vitesco Technologies GmbH, Hannover (DE)

(72) Inventors: Eusebio-Marius Albert, Munich (DE); Mihai Drienovsky, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 195 days.

(21) Appl. No.: 17/283,352

(22) PCT Filed: Sep. 27, 2019

(86) PCT No.: PCT/EP2019/076271
§ 371 (c)(1),
(2) Date: Apr. 7, 2021

(87) PCT Pub. No.: WO2020/074281
PCT Pub. Date: Apr. 16, 2020

(65) Prior Publication Data
US 2022/0006348 A1 Jan. 6, 2022

(30) Foreign Application Priority Data

Oct. 8, 2018 (EP) .................................. 18465592

(51) Int. Cl.
*H02K 5/04* (2006.01)
*H02K 15/14* (2006.01)
*H02K 7/10* (2006.01)
*H02K 5/12* (2006.01)

(52) U.S. Cl.
CPC .............. *H02K 5/04* (2013.01); *H02K 15/14* (2013.01)

(58) Field of Classification Search
CPC .. H02K 5/04; H02K 5/12; H02K 7/10; H02K 15/14
USPC ............................ 310/43, 75 R, 88, 89, 98
See application file for complete search history.

(56) References Cited

U.S. PATENT DOCUMENTS

2004/0012289 A1* 1/2004 Gross .................... F04D 29/626
310/91

FOREIGN PATENT DOCUMENTS

| DE | 102013101938 | | 8/2014 | |
| DE | 102013101938 A1 * | 8/2014 | ........... F02D 9/1035 |
| FR | 3059060 | | 5/2018 | |

OTHER PUBLICATIONS

Office Action of the corresponding European Patent Application No. 18465592.6.

* cited by examiner

*Primary Examiner* — Jose A Gonzalez Quinones
(74) *Attorney, Agent, or Firm* — Cozen O'Connor

(57) ABSTRACT

A method for fixing a first component in a second component. At least part of an internal side of the second component is overmolded for a plastic sleeve, and the first component is centered and fixed within the plastic sleeve of the second component by a press-fit. Secure fixing of the first component in the second component is achieved in this way. A unit is formed by a method of this type.

11 Claims, 1 Drawing Sheet

METHOD FOR FIXING A FIRST COMPONENT IN A SECOND COMPONENT, AND UNIT, IN PARTICULAR AN ACTUATOR, FORMED BY THE METHOD

CROSS REFERENCE TO RELATED APPLICATIONS

This is a U.S. national stage of Application No. PCT/EP2019/076271 filed Sep. 27, 2019. Priority is claimed on European Application No. EP 18465592.6 filed Oct. 8, 2018 the content of which is incorporated herein by reference.

BACKGROUND OF THE INVENTION

1. Field of the Invention

The present disclosure relates to a method for fixing a first component in a second component, wherein the first component is centered and fixed in the second component by a press-fit.

2. Description of Related Art

A method of this type is known and is used, for example, for fixing an electric motor, in particular a DC motor, in the housing of an actuator. Such an actuator can serve for controlling specific components, for example, wherein the electric motor is connected to a gearbox that provides a respective quantitative motion.

Fixing the first component, for example the DC motor, in the second component, for example the actuator housing, herein is performed by a press-fit, and this press-fit must be suitable for two arbitrary components since the tolerance range has to be taken into account in the case of respective components. There is furthermore the issue that the press-fit must be suitable for all temperatures of a respective operating temperature range, for example between −40° C. and 200° C. However, since the first component and the second component are usually composed of different materials, which have dissimilar thermal expansion coefficients, and since both materials have a determined range of dimensional tolerances at dissimilar temperatures, and some dimensional differences are present, it can arise herein that the press-fitting force between the first component and the second component becomes excessively large and respective stresses are generated in the components in this way, or the press-fitting force becomes excessively small such that there is no longer any contact between the components and a gap is formed therebetween.

SUMMARY OF THE INVENTION

One aspect of the present invention is based on providing a method of the type described at the outset by way of which particularly secure mutual fixing of the components can be achieved.

One aspect of the invention is a method of comprising:

Overmolding at least part of an internal side of the second component in order for a plastic sleeve to be configured; and centering and fixing the first component within the plastic sleeve of the second component by a press-fit.

Without influencing the respective tolerance ranges of the components, one aspect of the present invention proposes an additional part to be disposed in the system, the additional part being generated by overmolding the internal side of the second component. The first component is then centered and fixed on the plastic sleeve overmolded on the second component.

The transition between the first component and the second component is equalized or adapted, respectively, on account of an intermediate part being disposed between both components, such that the respective differences in the press-fitting forces can largely be reduced or normalized, respectively. The appearance of excessively high press-fitting forces, on the one hand, and of excessively low press-fitting forces, on the other hand, which lead to the disadvantages mentioned above is thus avoided despite different materials, dissimilar thermal expansion coefficients, different temperatures, etc.

In the case of the method according to one aspect of the invention, overmolding is preferably carried out by way of a plastic sleeve of which the thermal expansion coefficient is adapted to the thermal expansion coefficient of the first component and/or the second component in such a manner that no boundary stresses in the components are exceeded in an operating temperature range when/after press-fitting, and no loss in contact arises between the components. A plastic sleeve having a thermal expansion coefficient which meets the above conditions in an operating temperature range from −40° C. to 200° C. is overmolded in particular herein.

The material for the overmolded plastic sleeve is therefore selected such that the thermal expansion coefficient of the material in combination with the thermal expansion coefficient of the first component and the thermal expansion coefficient of the second component does not cause any damage to the system in the stated temperature range and moreover also does not cause any gap between the components, the gap being the result of the press-fit being released.

The method according to one aspect of the invention is preferably used in an application in which a DC motor is used as the first component, and an actuator housing is used as the second component. The actuator housing herein is configured so as to be substantially cylindrical. As has been mentioned, overmolding with the plastic sleeve takes place on at least part of the internal side of the actuator housing. Both the base as well as the cylindrical internal wall of the actuator housing herein can be overmolded with the plastic sleeve. Only a part of the cylindrical internal wall that is provided for the press-fit can also be overmolded.

In the case of one particularly preferred embodiment a first component that has a centric appendage on the lower side, which engages in a clearance of the second component, is used, and the internal side of the clearance is overmolded in order for the plastic sleeve, or part thereof, respectively, to be configured thereon. A bearing bushing for a rotor (bronze bushing) of the DC motor can herein be disposed in the appendage, for example. The appendage of the first component is then disposed by a press-fit in the clearance of the second component that is overmolded with the plastic sleeve.

In the method according to one aspect of the invention, a plastic sleeve that in the section is H-shaped is particularly overmolded in the base region of the second component, the appendage of the first component engaging in the plastic sleeve. The centering of the first component herein always takes place in one of two functional stages, specifically an inner press-fit between the first component and the overmolded plastic sleeve, and an outer press-fit between the first component and the overmolded plastic sleeve, since the overmolded plastic sleeve herein contacts the second component from the inside and from the outside.

One aspect of the present invention is in any case not limited to the application described above. The present invention can be used wherever an assembly by a press-fit is required and the respective system has to operate particularly in a large temperature range.

In any case, the axial force of the press-fit in the case of the method according to one aspect of the invention is also dimensioned such that the respective components, for example the DC motor and the actuator housing, are not damaged during assembling.

On account of the dissimilar thermal expansion coefficients adapted according to one aspect of the invention of the materials used for the motor housing, the overmolded plastic sleeve, and the actuator housing, the stresses that are generated in the system on account of the press-fit are lowered below a critical limit. In particular, the contact between the components for an arbitrary temperature in the respective temperature range that is required for the functional mode of the system (for example −40° C. to 200° C.) is not lost since the centering procedure is always in two states:

State 1: Inner press-fit between the second component (actuator housing) and the overmolded plastic sleeve
State 2: Outer press-fit between the second component (actuator housing) and the overmolded plastic sleeve.

Depending on actual dimensional values and the temperature, the centering alternates between state 1 and state 2 and vice versa, such that a press-fitting force is always present during the transition.

One aspect of the invention furthermore relates to a unit formed by a method of the type described above. The unit is preferably an actuator, an electric motor, in particular a DC motor, fixed in the housing of the actuator by way of a press-fit.

BRIEF DESCRIPTION OF THE DRAWINGS

The invention will be explained in detail hereunder by exemplary embodiments in conjunction with the drawings. In the drawings.

DETAILED DESCRIPTION OF THE PRESENTLY PREFERRED EMBODIMENTS

Figure 1:
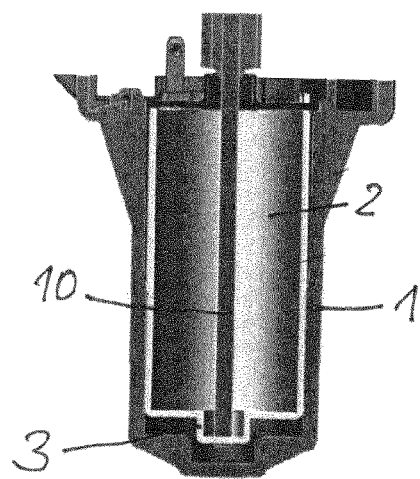
FIG. 1 is a fixing of a first component, configured as a DC motor, in a second component, configured as an actuator housing, by press-fitting in the prior art.

In the case of the method illustrated in FIG. 1, an approximately cylindrical first component 2, which in the present case is a DC motor having a respective housing, is fixed in a second component 1, which here is configured as an actuator housing. The approximately cylindrical first component 2 herein is inserted into the approximately cylindrical interior space of the second component 1, that is to say centered in the latter and fixed by a press-fit.

The first component 2 on the lower side thereof has an appendage 3 which can contain, for example, a bronze bushing for a bearing of a rotor 10 of the DC motor.

Figure 2:
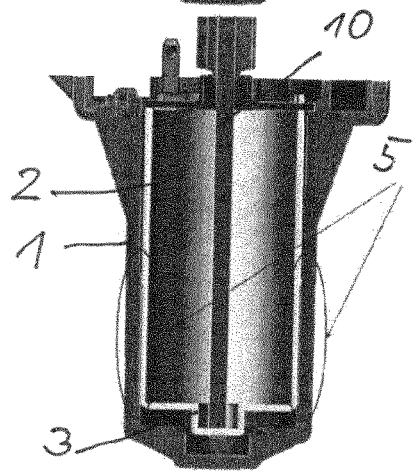
FIG. 2 is a view as in FIG. 1, with the press-fit region identified.

FIG. 2 shows a press-fit region 5 between both components, the press-fit region 5 ensuring the fixing of the DC motor in the actuator housing.

Since the first component 2, that is to say the motor housing, and the second component 1, that is to say the actuator housing, are composed of different materials having dissimilar thermal expansion coefficients, and both have a predefined dimensional tolerance range at different temperatures as well as some dimensional variations, the press-fitting force between the first and the second component can either become excessively large or excessively small. The problems resulting therefrom have already been discussed at the outset.

Figure 3:
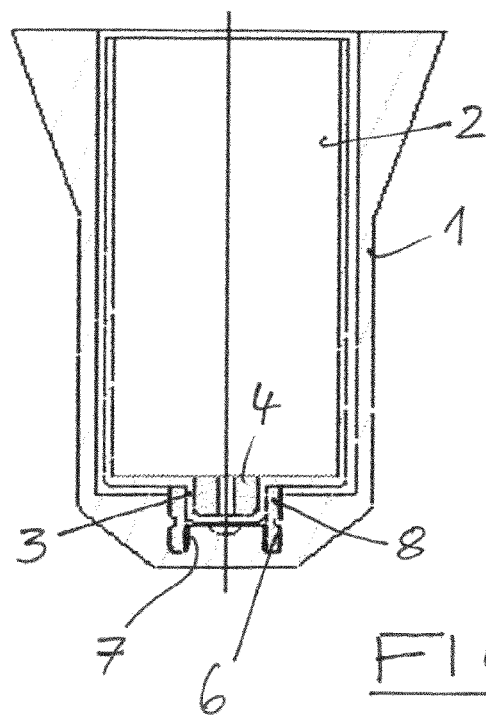
FIG. 3 is the fixing of a first component in a second component.

The problems are overcome by the method according to the invention. First, at least part of the internal side of the second component 1 is overmolded for a plastic sleeve 8 to be configured. A plastic sleeve of this type having an H-shape in the section is illustrated at 8. In the case of this embodiment, the base of the internal space of the second component 1, the base having a centric depression for receiving the bearing appendage 3 of the motor housing, in the region of the depression is thus overmolded such that the plastic sleeve 8 that is H-shaped in the section and is illustrated in FIG. 3 results. The overmolding mentioned should preferably be carried out using a plastic material of which the thermal expansion coefficient is between that of the first and that of the second component.

The bearing appendage 3 of the first component 2 is then centered and fixed by a press-fit within the plastic sleeve 8 formed. An inner press-fit between the plastic sleeve 8 and the second component 1, as is shown at 7, and an outer press-fit between the plastic sleeve 8 and the second component 1, as is shown at 6, results herein, since the overmolded plastic sleeve 8 configured, by way of the radial external side thereof as well as by way of the radial internal side thereof, by virtue of the H shape of the plastic sleeve 8 contacts the second component 1. Depending on the actual dimensional values and on the temperature, when centering a transition takes place from state 1 (inner press-fit 7 between the second component 1 and the overmolded plastic sleeve 8) to state 2 (outer press-fit 6 between the second component 1 and the overmolded plastic sleeve 8) and vice versa, such that a press-fitting force is always present during the transition.

The overmolded plastic sleeve 8 thus ensures secure fixing even at high temperature differentials, and in the case of different materials of the first component and of the second component.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for fixing a first component in a second component, comprising:
overmolding at least part of an internal side of the second component to form a plastic sleeve; and
centering and fixing the first component within the plastic sleeve of the second component by a press-fit.

2. The method as claimed in claim 1, wherein a thermal expansion coefficient of the plastic sleeve is adapted to a thermal expansion coefficient of the first component and/or a thermal expansion coefficient of the second component such that no boundary stresses in the first component and the second component are exceeded in an operating temperature range when/after press-fitting, and no loss in contact arises between the first component and the second component.

3. The method as claimed in claim 2, wherein the plastic sleeve has a thermal expansion coefficient configured for an operating temperature range from −40° C. to 200° C.

4. The method as claimed in claim 1, wherein a DC motor is the first component, and an actuator housing is the second component.

5. The method as claimed in claim 1, wherein the first component which has a centric appendage on a lower side that engages in a clearance of the second component, and an internal side of the clearance is overmolded.

6. The method as claimed in claim 1, wherein the centering of the first component at least one of:
- an inner press-fit between the second component and the overmolded plastic sleeve; and
- an outer press-fit between the second component and the overmolded plastic sleeve.

7. A method for fixing a first component in a second component, comprising:
- overmolding at least part of an internal side of the second component to form a plastic sleeve; and
- centering and fixing the first component within the plastic sleeve of the second component by a press-fit,
- wherein the first component which has a centric appendage on a lower side that engages in a clearance of the second component, and an internal side of the clearance is overmolded, and
- wherein the plastic sleeve is H-shaped is overmolded in the clearance in a base region of the second component, the centric appendage of the first component engaging in the plastic sleeve.

8. A unit comprising:
- a first component; and
- a second component,
- a plastic sleeve formed by overmolding at least part of an internal side of the second component;
- wherein centering and fixing the first component within the plastic sleeve of the second component is formed by a press-fit.

9. The unit as claimed in claim 8, wherein the unit is an actuator.

10. The unit as claimed in claim 9, wherein the first component is an electric motor.

11. The unit as claimed in claim 8, wherein
the first component is a DC motor; and
the second component is a housing,
the DC motor fixed in the housing by a press-fit.

* * * * *